US007650971B2

(12) United States Patent
Pillin et al.

(10) Patent No.: US 7,650,971 B2
(45) Date of Patent: Jan. 26, 2010

(54) SAFETY LOCK FOR ELEVATOR LANDING DOOR DETECTING INTRUSION IN THE SHAFT THROUGH THE LANDING DOOR AND ELEVATOR THUS EQUIPPED

(75) Inventors: David Pillin, Saint-Brisson sur Loire (FR); Sébastien Fougeron, Les Bordes (FR); Gérard Sirigu, Gien (FR)

(73) Assignee: Otis Elevator Company, Farmington, CT (US)

( * ) Notice: Subject to any disclaimer, the term of this patent is extended or adjusted under 35 U.S.C. 154(b) by 427 days.

(21) Appl. No.: 11/815,330

(22) PCT Filed: Feb. 3, 2005

(86) PCT No.: PCT/IB2005/000276

§ 371 (c)(1), (2), (4) Date: Aug. 2, 2007

(87) PCT Pub. No.: WO2006/082461

PCT Pub. Date: Aug. 10, 2006

(65) Prior Publication Data

US 2008/0135344 A1 Jun. 12, 2008

(51) Int. Cl.
*B66B 13/16* (2006.01)
*F16P 3/08* (2006.01)
*E05B 65/10* (2006.01)

(52) U.S. Cl. ......................... 187/331; 187/325; 70/277; 70/465

(58) Field of Classification Search ................. 187/301, 187/307, 314, 325, 331, 335; 70/277, 278.2, 70/278.3, 278.6, 279.1, 91, 399, 465
See application file for complete search history.

(56) References Cited

U.S. PATENT DOCUMENTS 1,466,900 A * 9/1923 Harper, Sr. ................... 70/399

(Continued)

FOREIGN PATENT DOCUMENTS

EP 1440930 A2 7/2004

(Continued)

OTHER PUBLICATIONS

PCT International Search Report and Written Opinion of the International Searching Authority for International application No. PCT/IB2005/000276 mailed Feb. 28, 2006.

*Primary Examiner*—Walter Benson
*Assistant Examiner*—Eduardo Colon-Santana
(74) *Attorney, Agent, or Firm*—Carlson, Gaskey & Olds PC

(57) ABSTRACT

The invention relates to a safety lock (1) for an elevator landing door detecting intrusion of a person in the shaft through the landing door, activating a bistable switch (21) through its spindle lever (11) putting the elevator into safe operation when the landing door is opened by turning the corresponding key, it being impossible to reset the switch (21) manually from the inside of the shaft, which comprises a device (17) fixing the lock in the open position with the door open, that is released when the door is closed such that the switch (21) can be reset by turning the lock (1) in the closing direction of the door in which the key is turned in the opposite direction to the opening direction, the switch (21) being reset mechanically by a mechanical means connected to the spindle lever (11).

10 Claims, 5 Drawing Sheets

U.S. PATENT DOCUMENTS

| | | | | | |
|---|---|---|---|---|---|
| 1,950,150 | A | | 3/1934 | Norton et al. | |
| 2,313,172 | A | * | 3/1943 | Rechberger | 187/314 |
| 3,922,814 | A | * | 12/1975 | Runft | 49/28 |
| 4,466,263 | A | * | 8/1984 | Rathmann | 70/264 |
| 4,469,200 | A | * | 9/1984 | Young et al. | 187/314 |
| 4,483,420 | A | | 11/1984 | Byrne | |
| 4,599,876 | A | * | 7/1986 | Johnson | 187/331 |
| 5,823,026 | A | * | 10/1998 | Finke | 70/276 |
| 6,659,514 | B2 | * | 12/2003 | Bass | 187/331 |

FOREIGN PATENT DOCUMENTS

| | | | |
|---|---|---|---|
| FR | 0109309 | A1 | 1/2003 |

* cited by examiner 3
27
25
9
1
19
11
13
5
27'
23
21

3
27
9
11
13
5
27'
23
21

SAFETY LOCK FOR ELEVATOR LANDING DOOR DETECTING INTRUSION IN THE SHAFT THROUGH THE LANDING DOOR AND ELEVATOR THUS EQUIPPED

BACKGROUND

The invention relates to a safety lock for an elevator landing door detecting intrusion of a person in the shaft through the landing door and the elevator thus equipped.

It is known that some elevator landing door locks are provided with a bistable safety switch activated by the landing door lock key when the door is opened, and putting the elevator into safe operation, such that it is impossible to do a manual reset from inside the shaft. Nevertheless, the switch position is reset electrically from the elevator machine room. This arrangement requires an electrical reset actuation device for the bistable switch and the corresponding wiring for the landing door in the elevator machine room. Moreover, during maintenance operations, the operator needs to perform a painstaking procedure for resetting in the elevator machine room and the corresponding to and fro movements.

An embodiment of the invention is designed to overcome these disadvantages and comprises a safety lock for an elevator landing door detecting intrusion of a person in the shaft through the landing door, activating a bistable switch through its spindle lever putting the elevator into safe operation when the landing door is opened by turning the corresponding key, it being impossible to reset the switch manually from the inside of the shaft, characterized in that it comprises a device fixing the lock in the open position with the door open, that is released when the door is closed such that the switch can be reset by turning the lock in the closing direction of the door in which the key is turned in the opposite direction to the opening direction, the switch being reset mechanically by a mechanical means connected to the spindle lever.

The bistable switch is of the type comprising an actuation tab or a lever projecting outwards moved by turning the lock from a first reset position in which the elevator is controlled in normal service to a second position when the door is opened in which the elevator is controlled in safe operation, and brought back to the rest position when the switch is reset, in a maneuver to closing the lock, with the door closed.

The bistable switch is protected from manual access by a casing covering it. Its position on the door lintel behind the landing door coupling plate activated by the lock, makes it even more difficult to access.

When the spindle lever is in the rest position, apart from reaching the coupling plate, through at least one spiral or helical spring wound around the lever spindle and bearing on the lintel through its two end strands arranged on each side of the spindle, advantageously it is the end strand of the spring close to the switch activation tab, which is lifted when the door lock opens and moves the switch tab from its first position to the second position in which the elevator is put into safe operation.

The at least one spring preferably composed to two spiral or helical springs wound fixed around the lever spindle and in which the external strands bear on the lintel at rest on each side of the lever spindle, the strand closest to the switch actuation tab being turned to contact towards it when the lock opening maneuver is performed.

The switch actuation tab may be actuated to move into its second position by an elastic tab or lever replacing the end strand of the spring fixed to the lock lever spindle in rotation and engaging on the switch actuation tab during opening.

The mechanical means connected to the spindle lever of the lock is advantageous composed of a rear tab fixed to the spindle lever of the lock and moving the switch actuation tab in its rest position, when the lock is turned closed, when the door is closed.

The device for locking the lock open, with the door open, formed in one example by creating a groove on the lock bushing fixed to the door lintel, in which a complementary mobile part fits into the groove, pulled towards it and locking the lock in the open position, this mobile part being pulled outside the groove by a mobile stop fixed to the landing door support carriage, arranged in the appropriate position to push the said mobile part outside the bushing groove when the landing door is closed.

The bushing preferably comprises at least one heel cooperating with the mobile complementary part in locking, during opening.

The mobile part is advantageously a plate installed free to pivot close to the lock bushing and pulled towards it by a spring, it being released by the plate being pushed by the said door carriage stop.

An embodiment of the invention also relates to an elevator equipped with at least one safety lock like that described above.

BRIEF DESCRIPTION OF THE DRAWINGS

An example embodiment is illustrated below through an example embodiment with reference to the appended figures, wherein.

DETAILED DESCRIPTION

Figure 1:
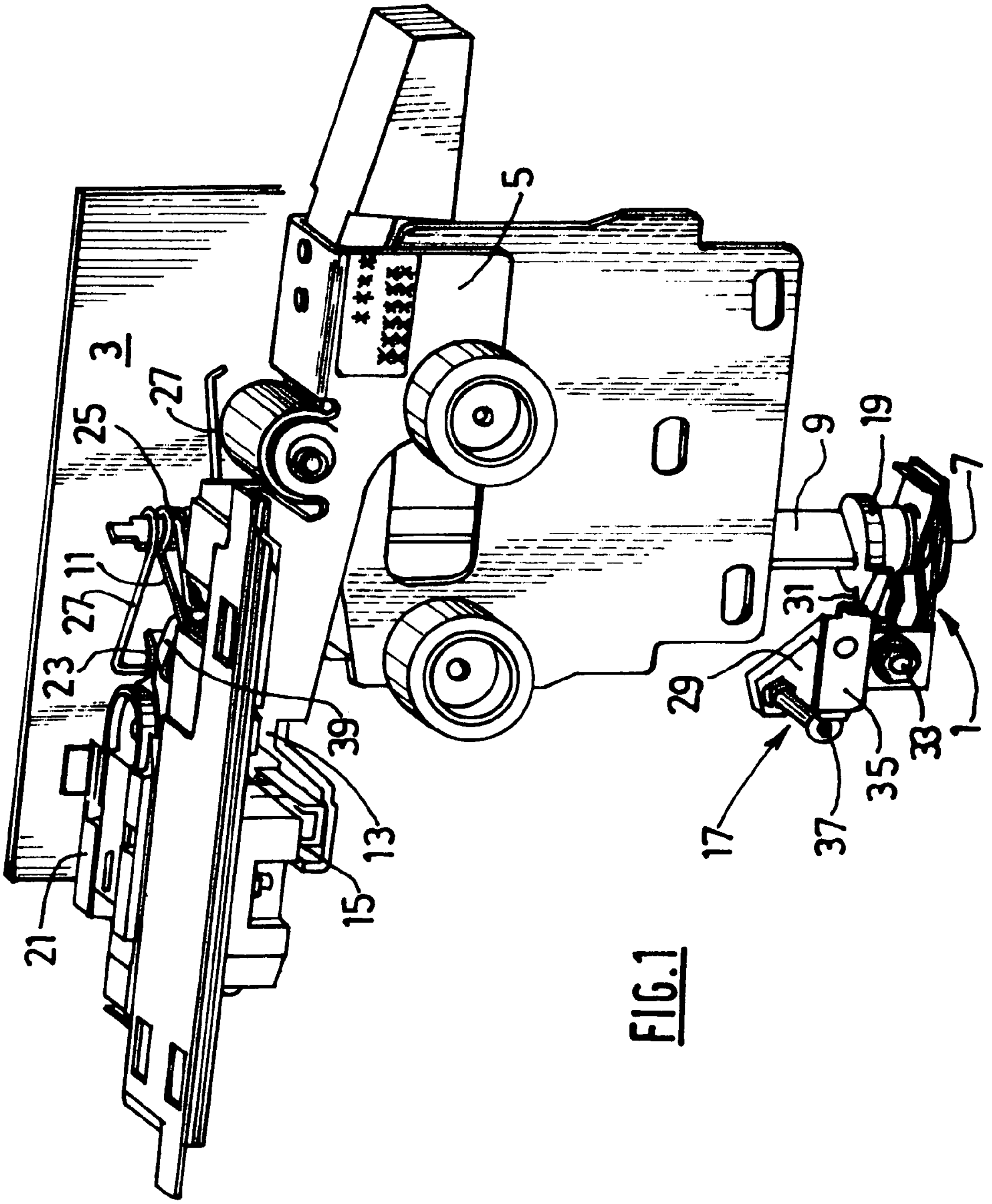
FIG. 1 is a perspective view of the safety lock for an elevator landing door according to an embodiment of the invention, the switch being in the normal elevator operating position.
Figure 2:
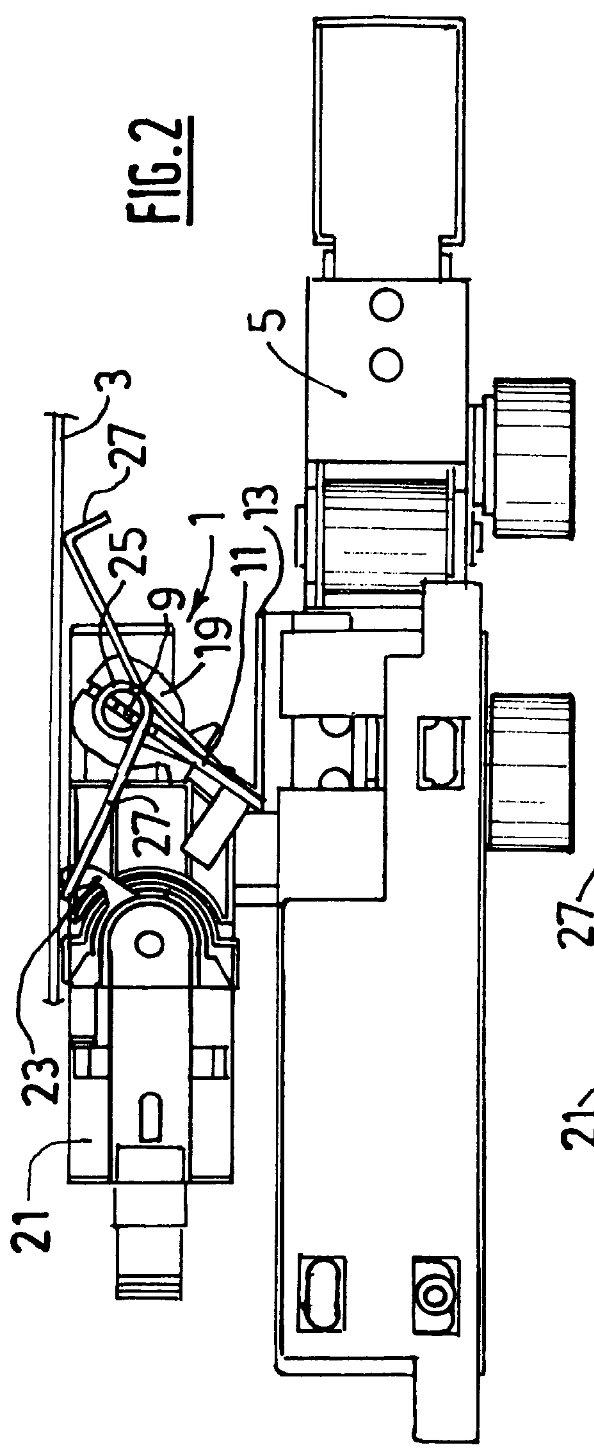
FIG. 2 is a corresponding top view of the lock according to FIG. 1.

With reference to the drawings and particularly to FIGS. 1 and 2, a safety lock 1 for an elevator landing door according to the example embodiment shown, is installed on the upper lintel 3 of the elevator landing door, on each floor of the building. It is fitted on a landing door with central opening or lateral opening, for example with two leaves simultaneously moving apart during opening, and moving closer in the opposite direction when closing.

It is arranged to engage on the end of the coupling plate 5 of the landing door.

Conventionally, it comprises an external opening 7 in which the lock actuation key fits, a manoeuvring lever spindle 9 for which the cranked end 11 mentioned as spindle lever is engaged during the opening manoeuvre on the end 13 of the elevator door coupling plate, to lower it and to release the closing hook and thus enable the landing door to open and the door closing contact 15 stopping the elevator, to open; it also comprises a locking device for the lock 17 installed on the base plate bushing 19 and locking the lock open as soon as the door opens.

A bistable switch 21 is also installed in the lintel 3 facing the end of the spindle lever 11 and behind the coupling plate 5. This switch 21 comprises an actuation tab or a mobile lever 23 projecting from its body and actuated through the spindle lever 11.

Figure 3:
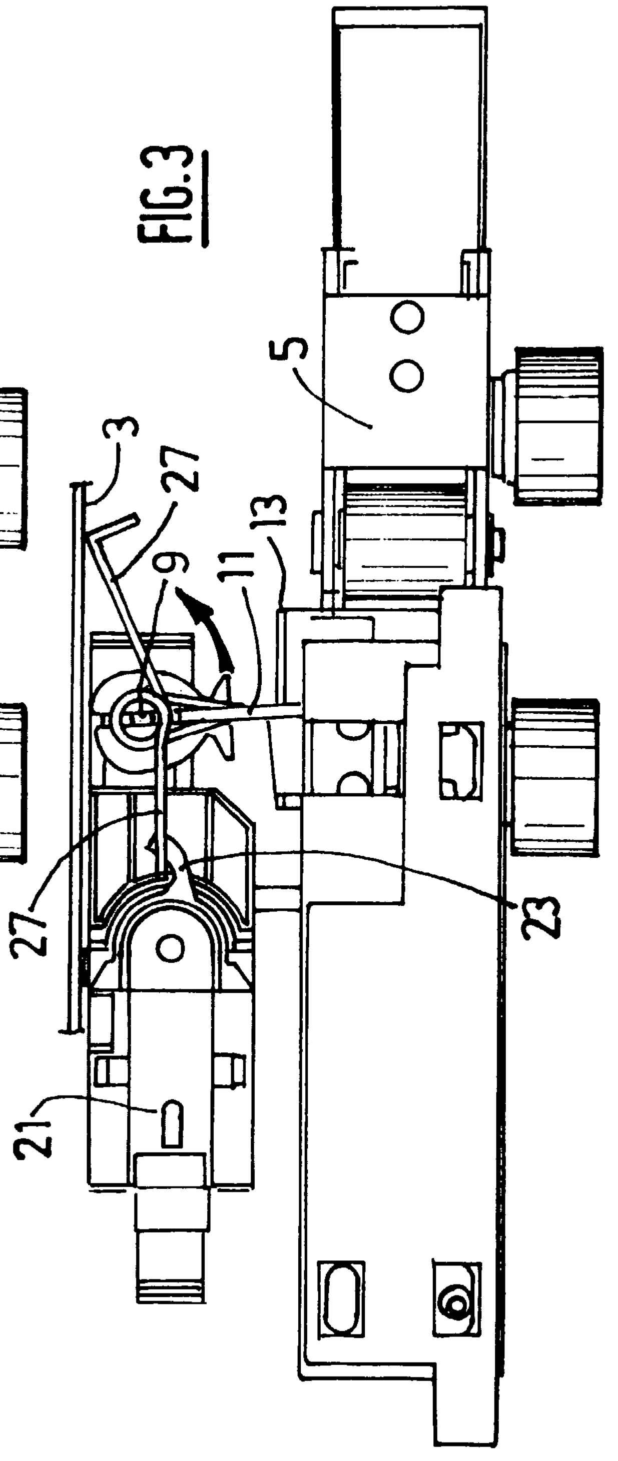
FIG. 3 is a top view of the lock during the lock opening manoeuvre.

The spindle lever 11 is returned to a rest position (FIG. 2) inclined at an angle of about 45° relative to lintel 3, by two helical springs 25 wound coaxially and fixed to the lever spindle, and for which the end outer strands 27 bear on the internal wall of the lintel 3. The outer strand of the spring 27 close to the switch 21 lifts when the lock opening manoeuvre takes place and engages under the switch lever 23 to move it from its rest position as shown in which the switch controls normal operation of the elevator, to a turned position (FIG. 3) in which the elevator is put into safety operation. Therefore when the lock is fully open, the switch lever 23 is turned into the operating safe position and remains stable in this position.

Figure 4:
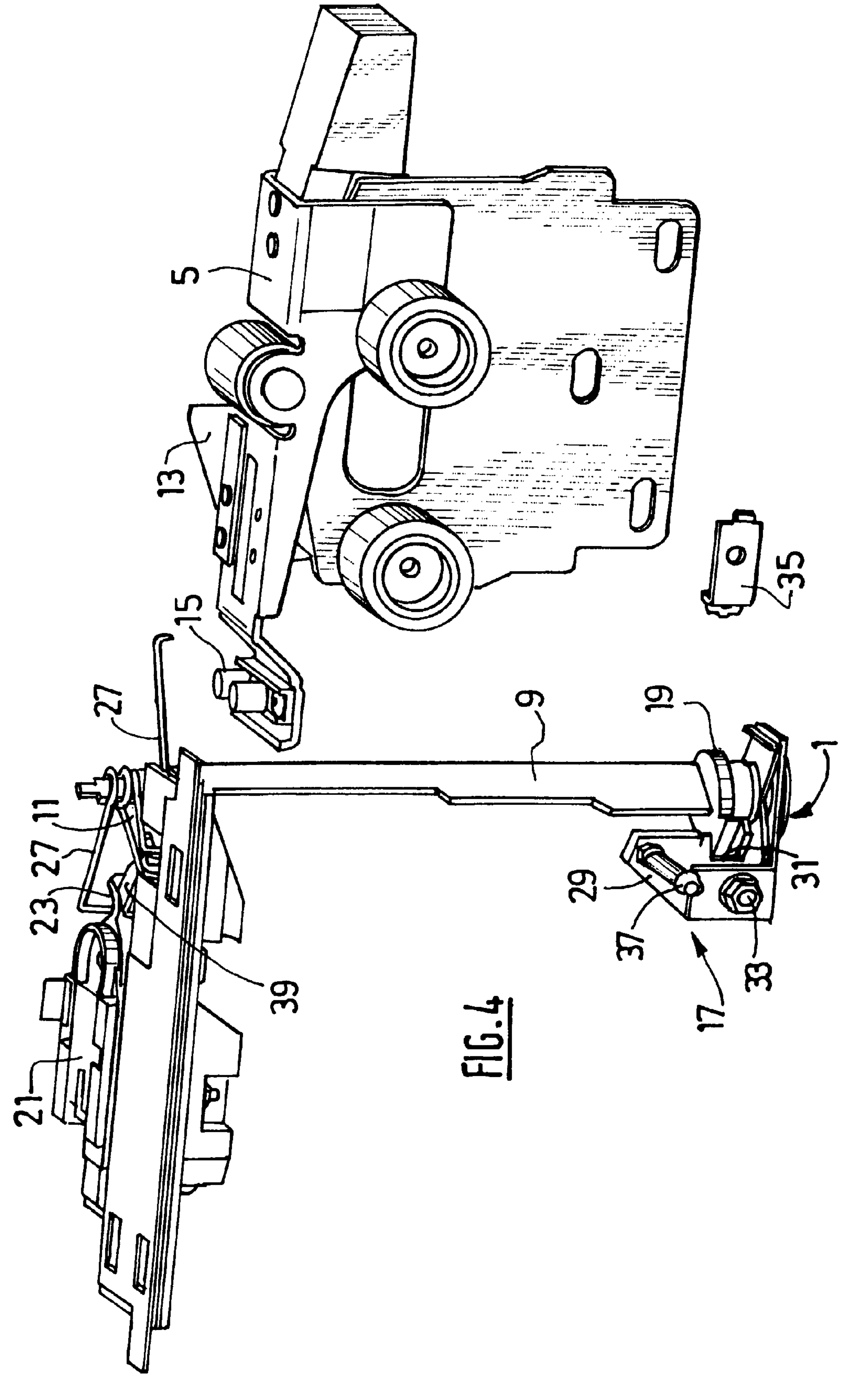
FIG. 4 is a perspective view of the lock with the door open, with the switch lever locked in the second position.

As soon as the landing door is opened, the locking device 17 moves into place (FIG. 4). This locking device activates a mobile plate 29 cooperating with the bushing 19 and in particular locks it at its end heel 31 at the lock base plate.

The plate 29 is articulated on a lower spindle 33 fixed to the lintel and is pulled back by a spring (spiral spring on the spindle not shown) towards the end heel 31 of the bushing 19, fitting into it by the force pulling them towards each other. Therefore the lock 1 is locked open and unlocking is only possible when the door closes when the plate 29 is pushed outside the bushing 19 by a stop 35 (represented alone) of the door leaf support carriage. This stop 35 is suitably arranged on it to touch the plate 29 or a part projecting from it, for example a rod or a screw 37 fixed onto it, and to move it over a short travel distance, when the door is nearly closed.

Figure 5:
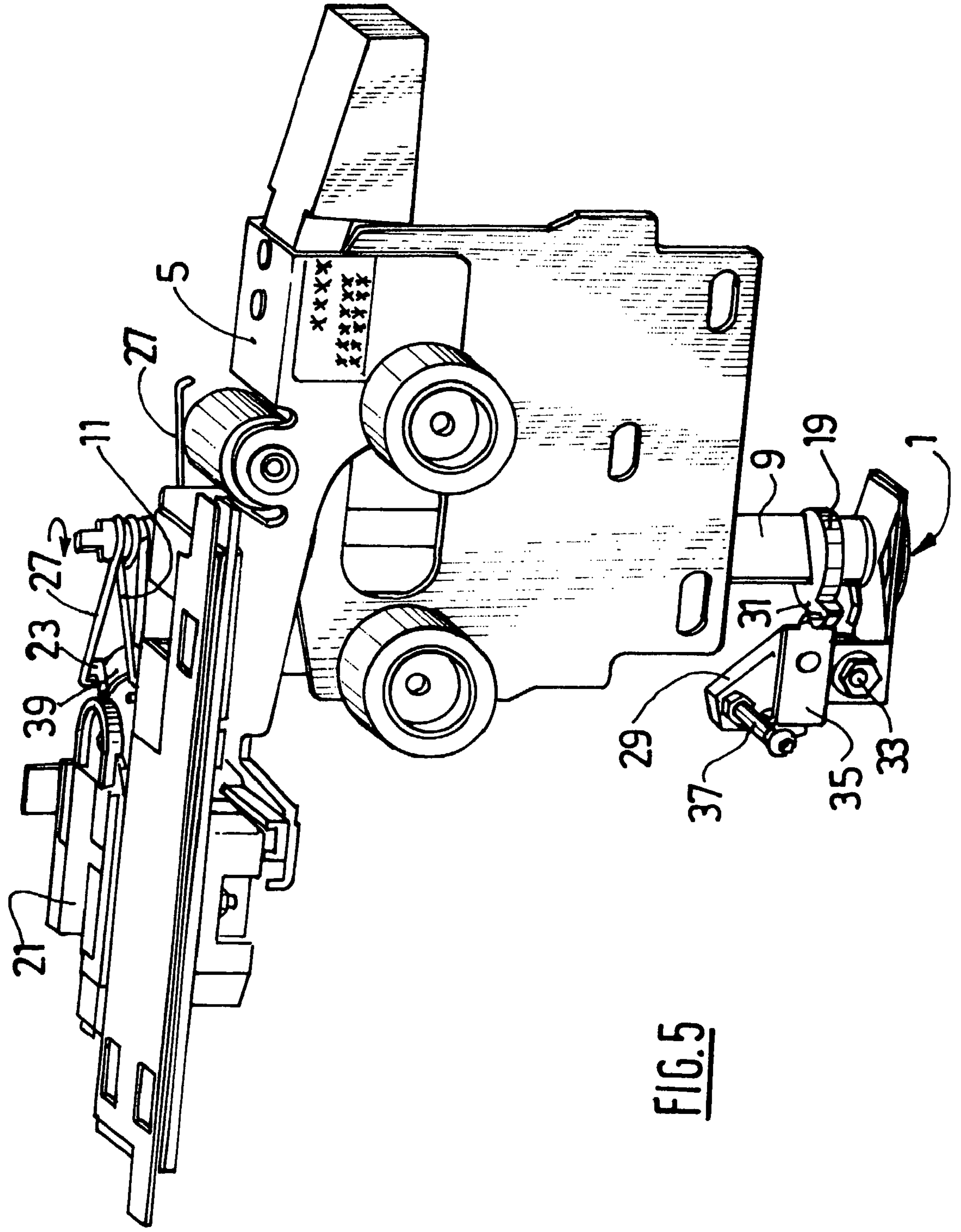
FIG. 5 is a perspective view of the lock showing the closing manoeuvre resetting the switch.
Figure 6:
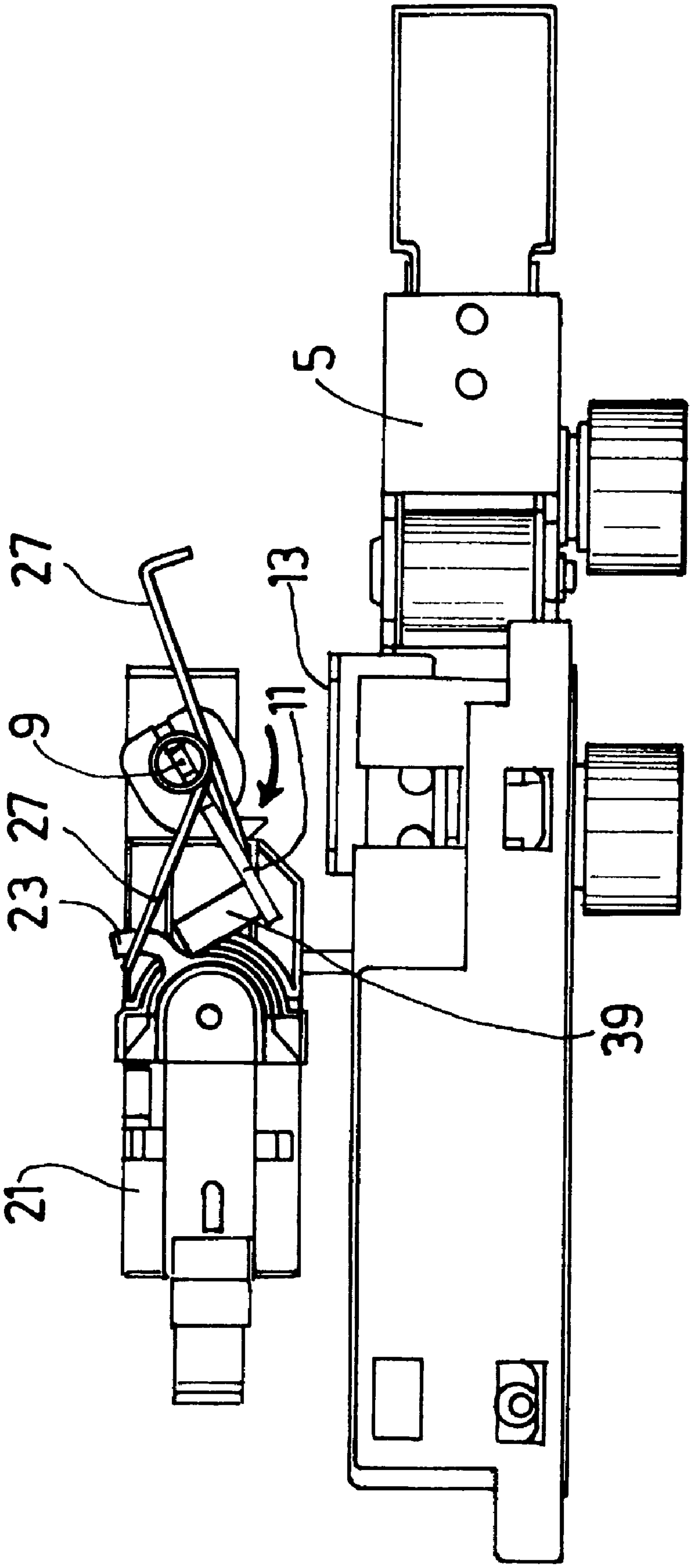
FIG. 6 is a top view of the lock corresponding to FIG. 5.

At this moment (FIGS. 5 and 6) as soon as the door is closed, the lock 1 can be moved in the opposite direction by its key, in the closing direction.

The spindle lever 11 comprising an upper end tab 39 turns in the direction of the arrow and then bears through it (FIG. 6) onto the lever 23 of the switch 21 to bring it back into its original position, thus resetting the switch 21 to once again enable normal operation of the elevator, while the coupling plate 5 is closed because the door has been closed.

Thus, the invention brings a simple mechanism for resetting the bistable elevator landing door safety lock switch, to signal intrusion of a person in the shaft on the landing, without the need for an electrical reset in the elevator machine room as mentioned in the preamble to the description.

Note as a variant embodiment of the invention, the lock spindle 9 may be arranged at a distance from the coupling plate 5, for example on one of the landing door leaves, and it may be equipped with appropriate movement return mechanisms both on the bistable safety switch 21 and on the door coupling plate 5, but with a device similar to that described above 17 for locking the lock when open.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The invention claimed is:

1. A safety lock for an elevator door, comprising:

a bistable switch configured to be activated by a spindle lever putting the elevator into safe operation when the landing door is opened by turning a corresponding key in an opening direction, it being impossible to reset the switch manually from the inside of an associated elevator shaft;

a device fixing the lock in the open position with the door open, the device being released when the door is closed such that the switch can be reset by turning the key in an opposite direction to the opening direction; and a mechanical switch setting member configured to reset the switch mechanically responsive to corresponding movement of the spindle lever as the key moves in the opposite direction.

2. Safety lock according to claim 1, wherein said bistable switch comprises an actuation tab or a lever projecting outwards, moved by turning the lock from a first rest position in which the elevator is controlled in normal service to a second position in which the elevator is controlled in safe operation when the door is opened, and brought back to the first rest position when the switch is reset.

3. Safety lock according to claim 1, wherein the mechanical switch setting member is connected to the spindle lever and comprises a tab fixed to the spindle lever, the tab moving the switch lever in its first rest position, when the lock is turned closed, when the door is closed.

4. Safety lock according to claim 1, wherein the bistable switch is protected from manual access by a casing covering the switch.

5. Safety lock according to claim 4, wherein the switch is positioned on a door lintel behind a landing door coupling plate activated by the lock.

6. Safety lock according to claim 5, wherein when the spindle lever is in a rest position, out of reach or the coupling plate biased by at least one spring bearing on the lintel through two end strands arranged on each side of the spindle lever, one end strand of the spring close to the switch moves when the door lock opens and moves the switch lever from a first position to a second position in which the elevator is put into safe operation.

7. Safety lock according to claim 1, wherein the device for locking the lock open, with the door open, comprises a tock bushing fixed to a door lintel and a groove engaged by a complementary mobile part pulled towards the lock bushing and locking the lock in the open position, the mobile part being pulled outside the groove by a mobile stop that moves with the landing door to push the mobile part outside the groove of the bushing when landing door is closed.

8. Safety lock according to claim 7, wherein the bushing comprises at least one heel cooperating with the complementary mobile part in locking, during opening.

9. Safety lock according to claim 7, wherein the mobile part is a plate installed free to pivot on a door lintel close to the lock bushing and pulled towards the bushing in engagement by a spring, the lock bushing being released by the plate being pushed by the stop when the landing door is closed.

10. Safety lock according to claim 1, wherein resetting of the switch is actuated by turning closed the lock, an upper end tab of the spindle lever being moved to bear onto the switch to bring it back for normal operation of the elevator.

* * * * *